(12) United States Patent
Nair et al.

(10) Patent No.: US 9,579,748 B2
(45) Date of Patent: Feb. 28, 2017

(54) METHOD OF FABRICATING ELECTROMAGNETIC BANDGAP (EBG) STRUCTURES FOR MICROWAVE/MILLIMETERWAVE APPLICATIONS USING LASER PROCESSING OF UNFIRED LOW TEMPERATURE CO-FIRED CERAMIC (LTCC) TAPE

(71) Applicants: E I DU PONT DE NEMOURS AND COMPANY, Wilmington, DE (US); WEMTEC, INC, Fulton, MD (US)

(72) Inventors: Deepukumar M Nair, Cary, NC (US); Michael Arnett Smith, Wake Forest, NC (US); James M Parisi, Stem, NC (US); Elizabeth D Hughes, Raleigh, NC (US); William E. Mckinzie, III, Fulton, MD (US)

(73) Assignees: E I DU PONT NEMOURS AND COMPANY, Wilmington, DE (US); WEMTEC Inc., Fulton, MD (US)

( * ) Notice: Subject to any disclaimer, the term of this patent is extended or adjusted under 35 U.S.C. 154(b) by 231 days.

(21) Appl. No.: 14/295,647

(22) Filed: Jun. 4, 2014

(65) Prior Publication Data
US 2014/0354513 A1 Dec. 4, 2014

Related U.S. Application Data

(60) Provisional application No. 61/830,817, filed on Jun. 4, 2013.

(51) Int. Cl.
| | | |
|---|---|---|
| *H01Q 15/14* | (2006.01) | |
| *B23K 26/00* | (2014.01) | |
| *H01Q 9/04* | (2006.01) | |
| *H01Q 15/00* | (2006.01) | |

(52) U.S. Cl.
CPC ...... *B23K 26/0084* (2013.01); *B23K 26/0006* (2013.01); *H01Q 9/0457* (2013.01); *H01Q 15/008* (2013.01); *B23K 2201/40* (2013.01); *B23K 2203/56* (2015.10)

(58) Field of Classification Search
CPC ......... H01Q 15/14; H01Q 1/38; H01Q 15/006
USPC ........................................ 343/912, 700 MS
See application file for complete search history.

(56) References Cited

U.S. PATENT DOCUMENTS

| | | | | |
|---|---|---|---|---|
| 7,764,232 B2* | 7/2010 | Achour | ................ | H01Q 21/065 343/700 MS |
| 8,018,375 B1* | 9/2011 | Alexopoulos | .......... | H01Q 19/10 342/175 |
| 8,514,036 B2* | 8/2013 | McKinzie, III | ........... | H01P 1/16 333/175 |
| 8,816,798 B2* | 8/2014 | McKinzie, III | ........... | H01P 1/16 333/175 |
| 2005/0029632 A1* | 2/2005 | McKinzie | ................. | H01P 1/16 257/665 |

* cited by examiner

*Primary Examiner* — Huedung Mancuso

(57) ABSTRACT

Substrates and methods to fabricate and use millimeter wave Sievenpiper EBG structures such that the conductive portions are internal to an LTCC package.

13 Claims, 5 Drawing Sheets

METHOD OF FABRICATING ELECTROMAGNETIC BANDGAP (EBG) STRUCTURES FOR MICROWAVE/MILLIMETERWAVE APPLICATIONS USING LASER PROCESSING OF UNFIRED LOW TEMPERATURE CO-FIRED CERAMIC (LTCC) TAPE

CROSS REFERENCE TO RELATED APPLICATIONS

This is a non-provisional application which claims priority under 35 U.S.C. 119(e) to U.S. Provisional Application Ser. No. 61/830,817, filed Jun. 4, 2013. The patent application identified above is incorporated herein by reference in its entirety to provide continuity of disclosure.

FIELD OF THE INVENTION

Subtrates and methods to fabricate and use millimeterwave Sievenpiper EBG structures such that the conductive portions are internal to an LTCC package.

BACKGROUND

Low Temperature Co-fired Ceramic (LTCC) technology is an electronic packaging platform especially suitable for high frequency system level packaging applications. A typical LTCC circuit substrate is formed by laminating multiple layers of ceramic tape under pressure and then firing the tape at high temperatures in the range of 800 to 900 degrees Celsius. On firing, LTCC forms a monolithic circuit containing electrical interconnections and provides for a highly reliable integrated circuit chip carrier platform. Electrical interconnections on LTCC substrates are generally formed by using thick film metallizations of gold, silver, or copper metals. Being a ceramic material, LTCC is a high reliability system and also has very good thermal properties in addition to extremely low dielectric loss for electrical signals. LTCC has a coefficient of thermal expansion (CTE) relatively close to that of semiconductor materials used for fabricating chips thereby making high reliability flip chip attachment possible.

Fabrication of microwave/millimeterwave circuits such as filters, amplifiers, oscillators etc. require very closely spaced conductor traces (line width and spacing of the order of 1 to 2 mil). The current state of the art process for thick film metal patterning on the internal layers of LTCC is screen printing, which is an additive process. LTCC technology using screen printing is limited to 3 mil line width and line spacing in the best case and hence will not be sufficient for efficient fabrication of microwave and millimeter wave circuits (circuits which operates above a frequency of 30 GHz). Other technologies such as vacuum deposition, electroplating etc. which can be used on the exterior surfaces of LTCC circuits cannot be used on the interior layers since patterning of internal layers is done while the LTCC tape is still in an unfired state.

The problem to be solved is to successfully manufacture a Sievenpiper EBG structure in LTCC packages for applications at millimeterwave frequencies. The difficulty is found in fabricating narrow gaps of less than 3 mils (75 um) between isolated conductive patches which are internal to a fired LTCC package. It is well known that patch antenna elements launch power into TM surface wave modes in their E-plane, and they are capable of launching TE surface wave modes in their H plane provided the host substrate is sufficiently thick to support the fundamental TE mode. These parasitic surface waves degrade antenna performance by diffracting at substrate edges where the edges become secondary sources of radiation. The net result is a loss of broadside directivity, higher side lobe levels, potentially multiple main beams, higher cross polarization, and poor front-to-back ratio. At millimeterwave (MMW) frequencies, the excitation of parasitic surface waves becomes a serious issue for LTCC antennas.

Almost all of the EBG related publications whose application frequency is below 15 GHz reference manufacturing by conventional printed circuit board techniques where etching of a Cu clad laminate is employed. It is difficult and costly to etch gaps below 3 mils with printed circuit board technology, and therefore EBG structures fabricated in this manner are limited in frequency to below approximately 15 GHz.

LTCC has been long recognized as a potential and desirable substrate for fabrication of EBG structures. Some fabricated examples of LTCC EBG structures have been published with predicted bandgap frequencies as high as 50 GHz. Examples of EBG structures fabricated in LTCC are simply not found above 40 GHz because gap dimensions of 3 mils (75 um) or less are required. Previously, this range of gap dimension has not been manufacturable using standard LTCC materials and processes.

There exists a need to integrate Sievenpiper EBG structures into antenna packages for applications above 40 GHz, namely for 60 GHz WLAN, for 60 GHz backhaul point-to-point data links, for 77 GHz automotive radar, and for 94 GHz imaging radars. The problem has been that there was no viable manufacturing technique to fabricate EBG structures inside LTCC packages for use at millimeterwave frequencies above 40 GHz. A need exists to fabricate gaps in conductors narrower than 3 mils (75 um) as an enabling technology required to support commercial LTCC packaging applications in the 60 GHz to 100 GHz frequency range. A high demand in the market exists for high frequency/high speed packaging materials, such as GreenTape™ LTCC, which is a key materials platform in the microwave/milimeterwave market. The ability to fabricate antenna structures transmitting with high radiation efficiency as provided by structures and methods of the present inventions is critical for that industry.

SUMMARY

In a first embodiment the invention is directed to an electromagnetic bandgap (EBG) structure having an LTCC package including (i) an array of internal conductive patches separated by gaps of no greater than 3 mils (75 um); (ii) an array of conductive vias in one or more tape layers connected to the array of conductive patches; and (iii) an RF backplane connected to the array of vias, wherein the array of conductive patches are created by block printing an unfired conductive paste on a plurality of unfired tape layers and laser ablating gaps between adjacent patches prior to firing.

In another embodiment, the invention is directed to a method of fabricating an electromagnetic bandgap (EBG) structure including forming an LTCC package comprised of a plurality of tape layers, forming an array of conductive patches on at least one of the tape layers by block printing a conductive paste, and laser ablating gaps between adjacent patches.

In another embodiment, the invention is directed to a method to transmit millimeterwave frequencies without excitation of parasitic surface waves including A) preparing an electromagnetic bandgap (EBG) structure comprising an LTCC package comprised of (i) an array of internal conductive patches separated by gaps of no greater than 3 mils; (ii) an array of conductive vias in one or more tape layers connected to the array of conductive patches; and (iii) an RF backplane connected to the array of vias, wherein the array of conductive patches are created by block printing an unfired conductive paste on a plurality of unfired tape layers and laser ablating gaps between adjacent patches prior to firing, and B) transmitting in circuits which operate above a frequency of 40 GHz.

DETAILED DESCRIPTION

Figure 1:
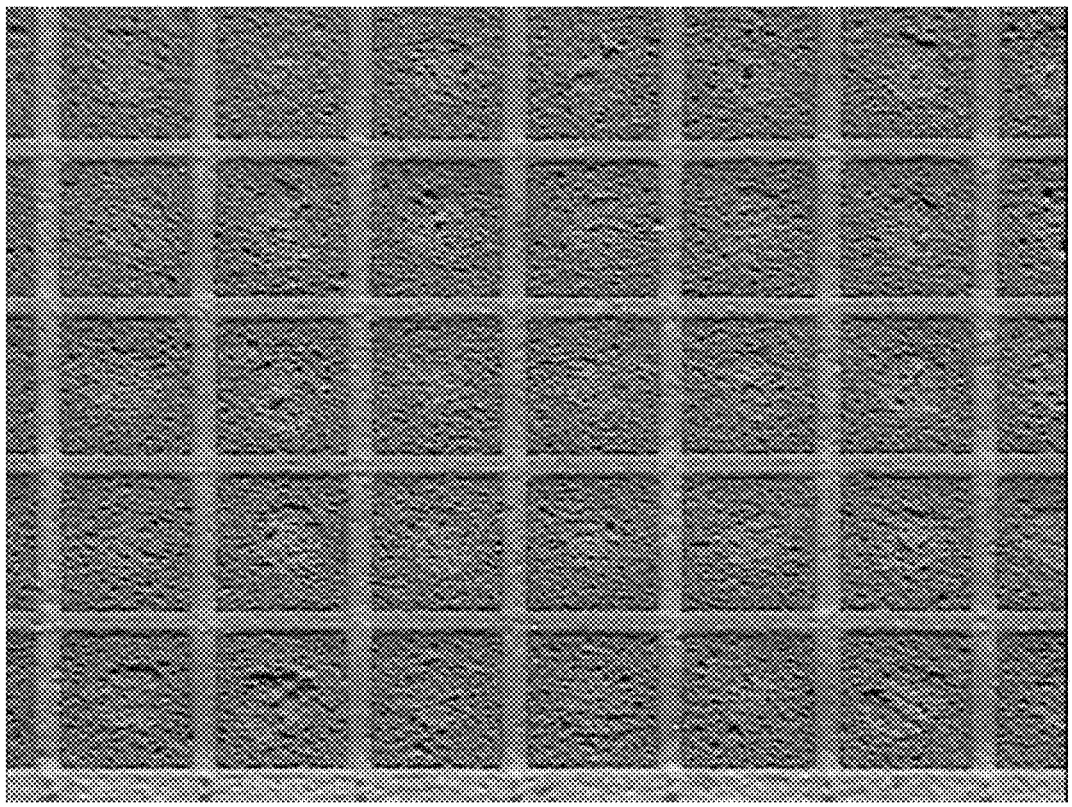
FIG. 1 is a photograph of the of an array with defined gap dimensions.

In a first embodiment, the invention is directed to an electromagnetic bandgap (EBG) structure having an LTCC package including (i) an array of internal conductive patches separated by gaps of no greater than 3 mils; (ii) an array of conductive vias in one or more tape layers connected to the array of conductive patches and an RF backplane connected to the array of vias. The array of conductive patches are created by block printing an unfired conductive paste on a plurality of unfired tape layers and laser ablating gaps between adjacent patches prior to firing. The gap dimension is adjusted to set a bandgap cutoff frequency to a desired value. The EBG structures create a surface wave stop band defined by a lower cut off and an upper cut off frequencies between which no bound surface wave is allowed to propagate. The EBG structure is designed to suppress noise which propagates as surface waves; noise cannot propagate in the EBG prohibited band. The small gap dimensions control the lower end of this prohibited band.

The present invention solves existing problems in the art by fabricating millimeterwave Sievenpiper EBG structures such that the conductive portions (patches, vias, and ground plane) are internal to an LTCC package, which allows the use of lower cost metals than gold. Another reason for the internal relationship is to share a common ground plane with nearby patch antenna elements while using more tape layers for the patch antenna than what would be required for the EBG structure. Simply, internalization of the EBG structure conductors requires the fabrication of internal LTCC conductors with gaps or slots that are narrower than 3 mils. The ability to fabricate gaps in conductors narrower than 3 mils is required to support commercial LTCC packaging applications operating above 40 GHz. The present invention provides this ability and is directed to integrating Sievenpiper EBG structures into antenna packages for such application. The Sievenpiper EBG structures are recognized in the art and explained in U.S. Pat. No. 6,262,495, incorporated herein in relevant part. In general, an EBG structure is a 2D or 3D metal and/or dielectric structure that will suppress the propagation of electromagnetic waves.

In another embodiment the invention is directed to a method of fabricating an electromagnetic bandgap (EBG) structure comprising forming an LTCC package comprised of a plurality of tape layers, forming an array of conductive patches on at least one of the tape layers by block printing a conductive paste, and laser ablating gaps between adjacent patches. The laser ablation is performed on a green sheet, or prior to firing the LTCC package. It should be understood by someone of ordinary skill in the art that the laser ablation process may be applied to individual green sheets prior to conventional LTCC fabrication processes of stacking, pressing, and co-firing. Therefore, any tape layers, including interior tape layers, may be laser ablated.

The array of conductive patches is internal to the LTCC package. The gap dimension between adjacent patches is 100 μm or smaller and is adjusted to set a bandgap cutoff frequency to a desired value. Presently, the EBG structure include gasp between adjacent patches with a gap width in the range of 25 to 75 microns. The EBG structure includes an array of conductive vias in one or more tape layers wherein the vias are connected to the array of conductive patches and an RF backplane wherein the array of vias is connected to the RF backplane.

The present invention uses laser ablation to form gaps in metalized surfaces of EBG structures on internal green sheet LTCC tape layers. These conductive surfaces may be formed by block printing a good quality conductive paste on a green sheet, and then cutting a pattern into the conductive paste and green sheet with a highly focused ultraviolet laser beam. A good quality conductive paste is defined as one where the post-fired surface resistivity is less than 100 milliohms per square. A preferred embodiment for the laser is a model Protolaser U3 ultraviolet laser available from LPFK Laser and Electronics AG in Garbsen, Germany. Most commonly, the laser spot size is approximately 25 um wide, and the minimum slot width that may be laser ablated is currently about 30 um. Specifically, the gaps are formed by ablating the thick film metallization on interior LTCC tape layers by a laser device in a defined design pattern on the thick film metallization on LTCC tape layers of a line width greater than 1 mil, wherein the thick film metallization on interior LTCC tape layers are unfired. This results in very tight lines and spaces of gaps (up to 1 mil resolution) within the multilayer LTCC structure which cannot be fabricated by using standard screen printing techniques. Such high resolution conductor patterns are necessary for fabricating microwave circuits and designed for packages working above 40 GHz frequency.

In one embodiment, the laser device for use to prepare the present invention includes an ultraviolet beam having a wavelength in the range of 240-350 nm and a beam spot diameter in range of 15-30 microns. These laser settings provide the parameters to obtain a line width between 1 mil (25.4 microns) and 3 mil (75 microns) by ablation of the metallization upon laser pass. Those skilled in the art would appreciate that the present method would permit greater line width if necessary. The laser is not required to "penetrate" the outer layers because each individual layer is processed separately in un-fired state then stacked up and laminated together followed by firing to form the monolithic circuit. This "subtractive" approach allows the ability to obtain line widths and gaps not available by current methods in the art. The ablation permits the resultant metalized tape to be sculpted into a desired pattern which improves the functionality of the device.

Figure 2:
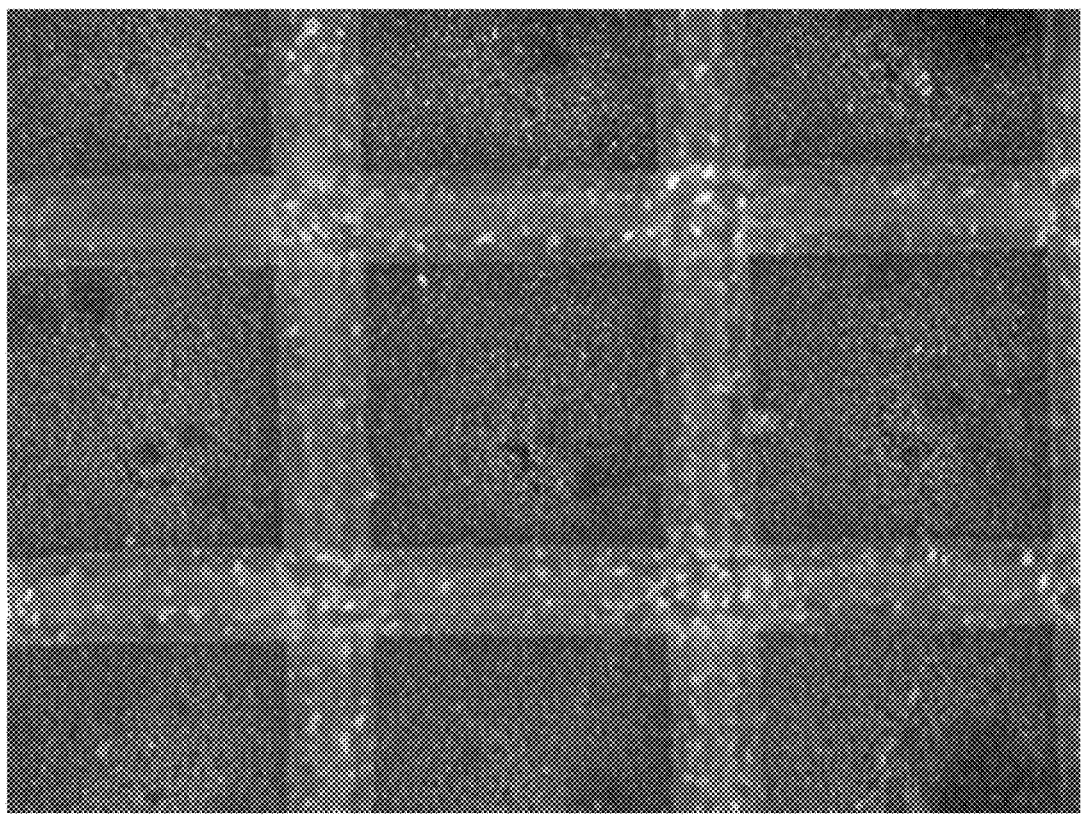
FIG. 2 is a photograph of a rectangular metal pattern by fabricated by laser ablation.

As illustrated in FIGS. 1 and 2, the method of the present invention provides gap dimensions which are repetitive with an acceptable standard deviation. Further, the method ensures substantially "smooth" edges which promote a consistent bandgap, or surface wave stopband, as a function of position within the EBG structure. Referring to FIG. 1, an array fabricated by the laser ablation process is illustrated having an average of gap width of 55 um with a standard deviation of 0.03; the actual gap dimension is designed to be 56 um. Referring to FIG. 2, a matrix structure is illustrated of rectangular metal patterns separated by controlled spacing fabricated by the ablation process of the present invention providing "smooth" edges and corner definition.

The laser may be computer controlled by using custom software or a commercially available software. CAD is the primary software to direct the laser and is commercially available. The CAD program can be a generic drawing software such as AutoCAD, or SolidWorks.

The tape layers are low loss glass ceramic dielectric tape for high frequency applications. Most commonly, DuPont GreenTape™ LTCC 9K7 and 9K5 LTCC materials systems are used. The thick film metallization material includes gold, silver, and copper thick film metallization and combinations thereof, having a thickness of between 7 and 20 microns.

The combination of tape and metal are core to defining the parameters of the laser.

These parameters are developed by a series of process experiments to obtain appropriate values to the desired outcome. A "test coupon" is created to recognize the interrelationship between the parameters and the specific result to be achieved. Specifically, for this purpose, the test coupon is fabricated under various process set points and measured performance parameters, including but not limited to, insertion loss of the transmission lines, return loss of the transmission lines, geometric definition of the lines, using Scanning Electron Microscope (SEM) micrographs, gap between conductors and the depth of "cut" in to the unfired LTCC sheet. This provides evidence that the particular parameters as defined are critical, and are required to obtain the desired results. Table 1 provides the ranges for A 340 nm UV laser using gold metallization tape deposited on DuPont GreenTape™ LTCC 9K7.

TABLE 1

| Laser Parameter (units) | Value |
| --- | --- |
| Pulse repetition frequency (KHz) | 100-150 |
| Laser Power (W) | 2-7 |
| Jump delay (micro seconds) | 1000-3000 |
| Jump speed (mm/s) | 500-1500 |
| Laser off delay (micro second) | 50-200 |
| Laser on delay (micro second) | 0-10 |
| Mark delay (micro second/s) | 400-800 |
| Mark speed (mm/s) | 100-500 |
| Polygon delay (micro second) | 0-10 |
| Air Pressure | NO |
| Repetition | 1-3 |
| Tool delay (milli second) | 0-10 |
| Tool Z - offset (um) | 0-10 |

This provides the capability of this laser ablation process to achieve line width of 1 mil (25.4 micron).

Figure 3:
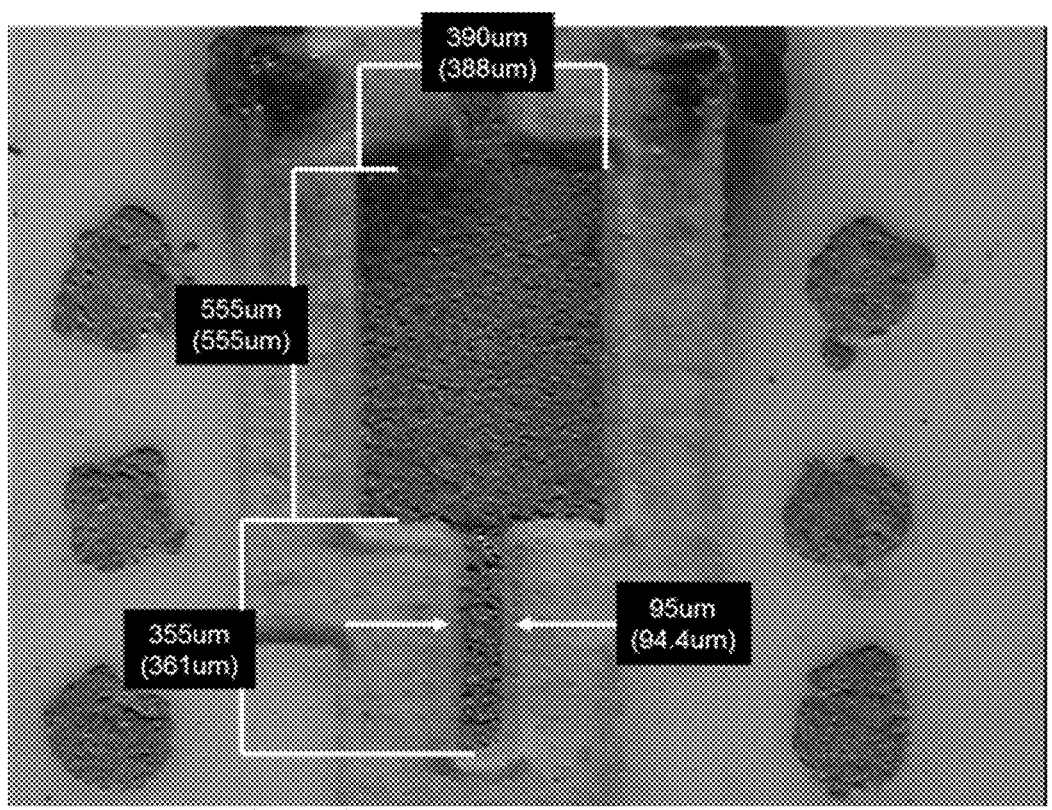
FIG. 3 is photograph of a rectangular shaped patch antenna on an LTCC fabrication by laser ablation.
Figure 4A:
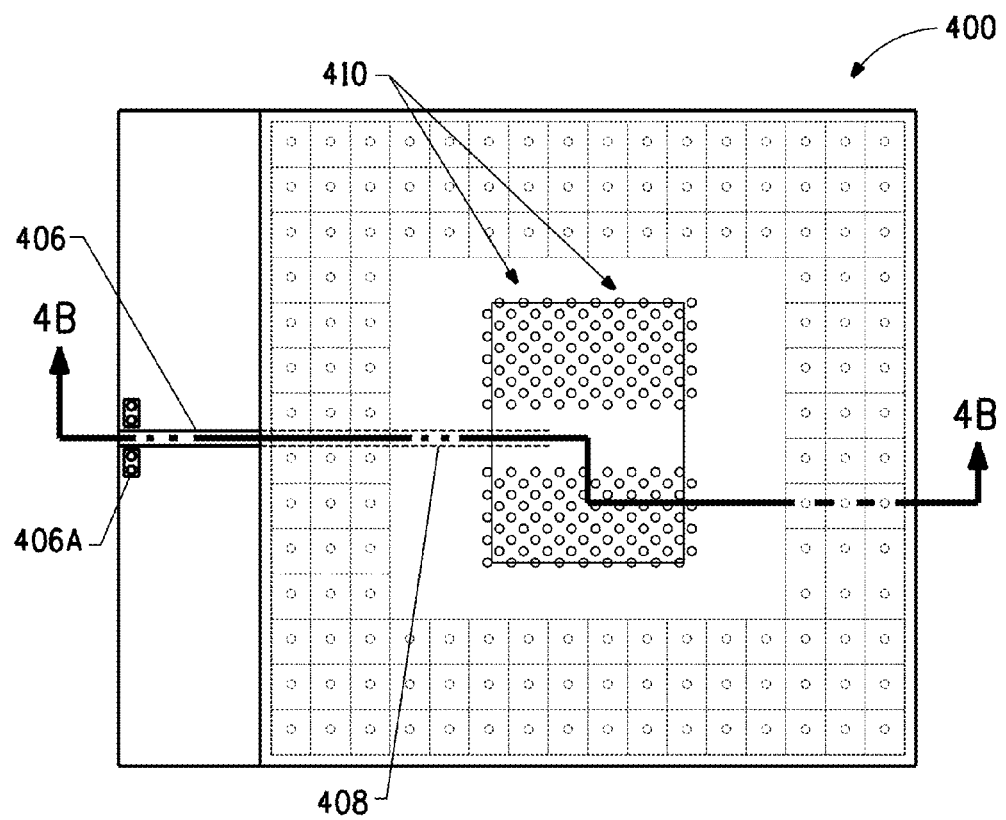
FIG. 4A is a plan view of a single patch antenna with a perimeter EBG structure and simple microstrip feedline with a wafer probe.
Figure 4B:
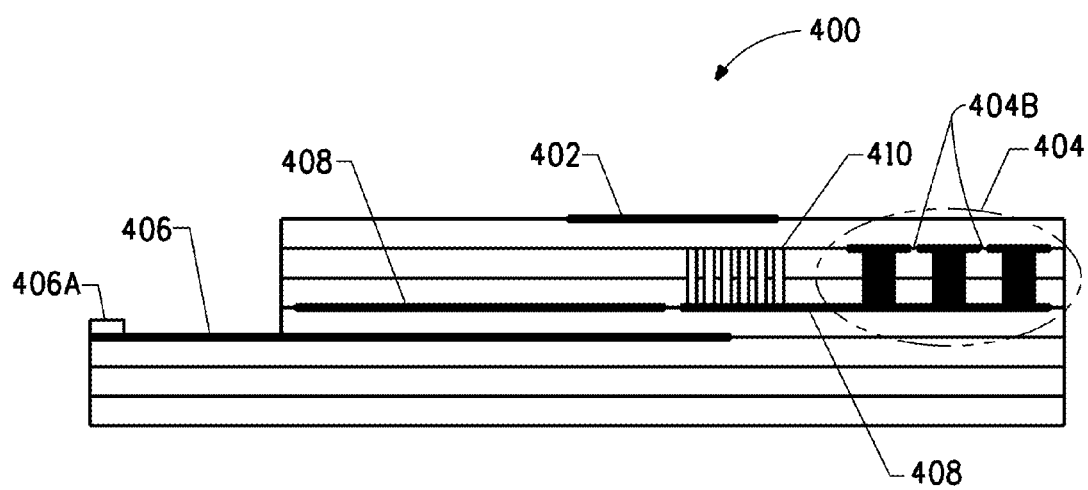
FIG. 4B is an elevation view of a single patch antenna with a perimeter EBG structure and simple microstrip feedline with a wafer probe.
Figure 5:
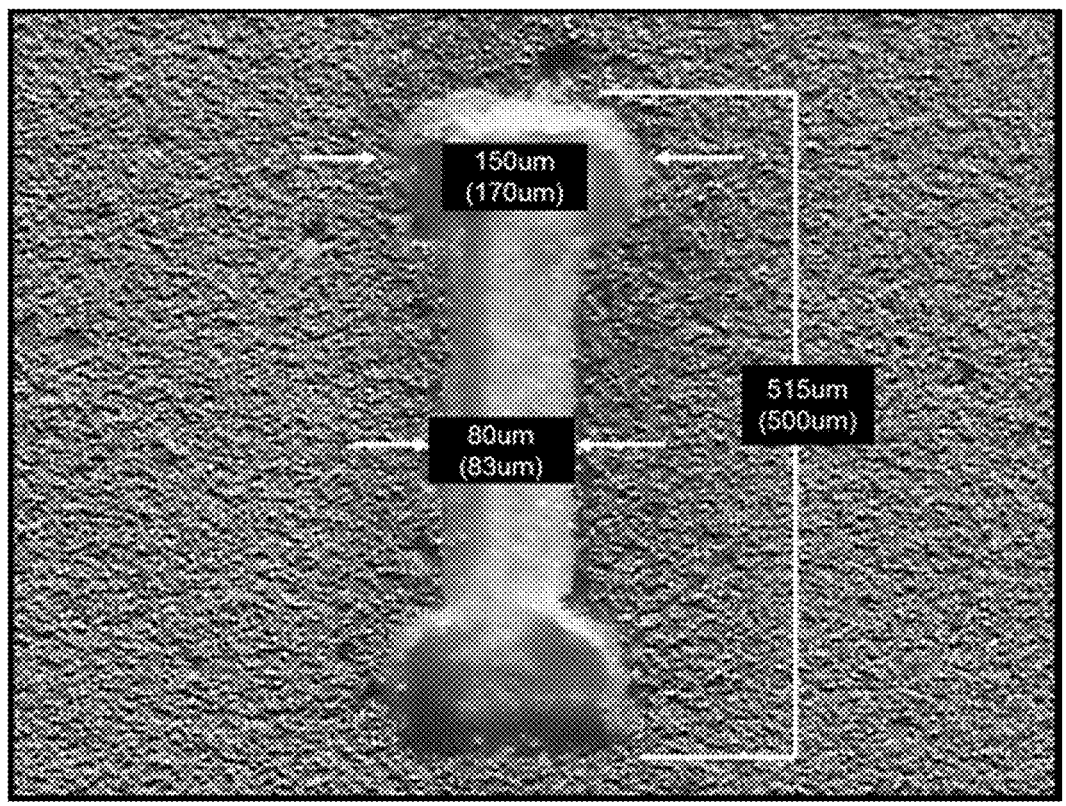
FIG. 5 is a photograph of an I-shaped coupling slot in an LTCC antenna fabricated by laser ablation.

Referring to FIGS. 3-5, the structure and method of the present invention provides a unique product which provides beneficial results regarding wavelength and improved transmission signal. Those skilled in the art would appreciate the ablation method can be implemented in various millimeter wave packages designs, including but not limited to "patch" or "slot" antenna designs; as illustrated in FIGS. 3 and 5 respectively. FIGS. 3 and 5 illustrate antenna designs on LTCC tape fabricated by the laser ablation process of the present invention. As fabricated dimensions are illustrated (the numbers in parenthesis are designed values), the measurements illustrate how closely the laser reproduces designed dimensions. The ability to obtain the design dimensions (or very close to the actual design dimensions) allow the desired frequency range and transmitting with high radiation efficiency.

FIGS. 4A and 4B, illustrate one exemplary structure of a millimeter wave package for incorporating the ablation process of the present invention. Structure design of the millimeter wave packages are well known in the art regarding the EBG structures, LTCC tape layers and alignment for optimal transmission and reduced resistance, e.g. U.S. Pat. No. 6,906,674 and US Publication No. 2012/0062346. However, prior art does not exist which uses the ablation process in a millimeter wave package to obtain a structure which operate above a frequency of 40 GHz.

As illustrated in FIGS. 4A and 4B, a non-limiting example of a millimeter wave package is illustrated for an efficient patch antenna with a perimeter EBG structure that suppresses surface waves and thus improves the antenna pattern with less pattern ripple and better front-to-back ratio. Multiple antenna designs can be generated at various frequencies including 60 GHz WLAN, for 60 GHz backhaul point-to-point data links, for 77 GHz automotive radar, and for 94 GHz imaging radars (as currently desired by the industry).

As most clearly illustrated in FIG. 4B, the structure 400 includes a patch antenna 402 surrounded by a perimeter EBG structure 404, wherein a ground plane 408 for the patch antenna is also the RF backplane of the EBG structure 404. The laser ablated gaps 404B between patches of the EBG structure 404 are illustrated, created by the laser ablation method discussed herein. The feed line 406 and adjacent wafer probe 406A, is proximal but separated from its ground plane 408; usually by one ceramic layer (about 5 mils thick). Each antenna element may contain an array of unfilled via holes 410 located below its resonant patch. The purpose of these empty via holes is to reduce the effective permittivity and thus improve antenna efficiency and bandwidth. Nominal via diameter is anticipated to be between 4 and 5 mils. This structure 400 will incorporate the ablation method to provide millimeter structure packages operating at frequencies above 40 GHz.

In a another embodiment, the invention is directed to a method to transmit millimeterwave frequencies while suppressing the propagation of parasitic surface waves including A) preparing an EBG structure comprising an LTCC package comprised of (i) an array of conductive patches having gaps of no greater than 3 mils; (ii) an array of conductive vias in one or more tape layers connected to the array of conductive patches; and (iii) an RF backplane connected to the array of vias, wherein the array of conductive patches are created by block printing an unfired conductive paste on a plurality of unfired tape layers and laser ablating gaps between adjacent patches prior to firing, and B) transmitting in circuits which operate above a frequency of 40 GHz.

The purpose of the present invention is to provide EBG structures that may be embedded into multilayer RF packages. Based on the structure of the present invention, a method of transmitting is provided which includes mitigation of internal coupling or crosstalk between radio frequency transmission lines inside a chip carrier or System in Package (SiP), mitigation of external coupling or crosstalk between bottom-side signal pads and solder balls, mitigation of external mutual coupling between embedded slot or patch antenna elements and mitigation of external surface currents around an antenna element to control pattern shape, therefore suppressing surface currents is a critical function of EBG structures.

What is claimed is:

1. An electromagnetic bandgap (EBG) structure comprising:
   a. an LTCC package comprised of (i) an array of conductive patches on LTCC tape layers separated by gaps, wherein some of the gap dimensions are between 1 and 3 mils; (ii) an array of conductive vias in one or more tape layers connected to the array of conductive patches; and
   b. an RF backplane connected to the array of vias, wherein the array of conductive patches are created by block printing an unfired conductive paste on a plurality of unfired tape layers and laser ablating gaps between adjacent patches prior to firing the LTCC package.

2. The structure of claim 1, wherein the gap dimension is adjusted to set a bandgap cutoff frequency to a desired value.

3. The structure of claim 1, wherein the structure transmits a frequency about 40 GHz.

4. A method of fabricating an electromagnetic bandgap (EBG) structure comprising:
   forming an LTCC package comprised of a plurality of tape layers,
   forming an array of conductive patches on at least one of the tape layers by
      block printing a conductive paste, and
      laser ablating gaps between adjacent patches which gaps have a dimension of between 1 and 3 mils.

5. The method of claim 4, wherein the process of laser ablation is performed on an unfired green tape prior to firing the LTCC package.

6. The method of claim 4, wherein the array of conductive patches is internal to the LTCC package.

7. The method of claim 4, wherein the thickness of the conductive paste is between 7 and 20 microns.

8. The method of claim 4, wherein the gap dimension is adjusted to set a bandgap cutoff frequency to a desired value.

9. The method of claim 4, wherein the EBG structure comprises an array of conductive vias in one or more tape layers wherein the vias are connected to the array of conductive patches.

10. The method of claim 9, wherein the EBG structure comprises an RF backplane wherein the array of vias is connected to the RF backplane.

11. The method of claim 10, wherein the EBG structure is a Sievenpiper EBG structure.

12. An EBG structure formed by the method of claim 11.

13. A method to transmit millimeterwave frequencies while suppressing the propagation of parasitic surface waves comprising:
   a. preparing a electromagnetic badgap (EBG) structure comprising (i) an LTCC package comprised of (A) an array of internal conductive patches separated by gaps of between 1 and 3 mils; (B) an array of conductive vias in one or more tape layers connected to the array of conductive patches; and (ii) an RF backplane connected to the array of vias, wherein the array of conductive patches are created by block printing an unfired conductive paste on a plurality of unfired tape layers and laser ablating gaps between adjacent patches prior to firing;
   b. transmitting in circuits which operate above a frequency of 40 GHz.

* * * * *